United States Patent
Kim et al.

(10) Patent No.: US 9,055,391 B2
(45) Date of Patent: Jun. 9, 2015

(54) METHOD AND APPARATUS FOR DISCOVERING DEVICE IN WIRELESS COMMUNICATION NETWORK

(71) Applicant: Samsung Electronics Co., Ltd., Gyeonggi-do (KR)

(72) Inventors: Changsoon Kim, Gyeonggi-do (KR); Byunghoon Seo, Seoul (KR); Jongmu Choi, Gyeonggi-do (KR); Hakkwan Kim, Gyeonggi-do (KR); Namju Cho, Gyeonggi-do (KR); Chanki Cho, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 145 days.

(21) Appl. No.: 13/767,334

(22) Filed: Feb. 14, 2013

(65) Prior Publication Data

US 2013/0223341 A1    Aug. 29, 2013

(30) Foreign Application Priority Data

Feb. 24, 2012   (KR) .................. 10-2012-0018952

(51) Int. Cl.
    *H04W 4/00*      (2009.01)
    *H04W 8/00*      (2009.01)
    *H04W 84/18*     (2009.01)

(52) U.S. Cl.
    CPC .............. *H04W 4/005* (2013.01); *H04W 8/005* (2013.01); *H04W 84/18* (2013.01)

(58) Field of Classification Search
    USPC .......................... 370/310, 312–313, 328–339
    See application file for complete search history.

(56) References Cited

U.S. PATENT DOCUMENTS

| | | | |
|---|---|---|---|
| 2005/0190747 A1* | 9/2005 | Sindhwani et al. ........... | 370/352 |
| 2007/0171910 A1* | 7/2007 | Kumar .......................... | 370/392 |
| 2008/0057936 A1 | 3/2008 | Oosawa | |
| 2011/0182207 A1 | 7/2011 | Naito et al. | |

FOREIGN PATENT DOCUMENTS

| | | |
|---|---|---|
| EP | 2117166 A1 | 11/2009 |
| WO | 2007/044597 A2 | 4/2007 |

OTHER PUBLICATIONS

"Wi-Fi Peer-to-Peer (P2P) Technical Specification"; 2010, Version 1.2, Wi-Fi Alliance.
Sung, Prof. Dan Keun; Mobile Communications Systems (MCS); 2000; EE624; Department of Electrical Eng. and Computer Science, K.A.I.S.T; 13 pgs.

* cited by examiner

*Primary Examiner* — Frank Duong
(74) *Attorney, Agent, or Firm* — Cha & Reiter, LLC

(57) ABSTRACT

A method and apparatus for discovering a device without an access point (AP) to perform P2P communication in a wireless communication network includes: receiving a probe request frame from another P2P device; determining whether a message requesting at least one of a phone number and user identification information is included in the received probe request frame; and transmitting a probe response frame including at least one of the phone number and the user identification information to the another P2P device when the message is included in the probe request frame.

19 Claims, 16 Drawing Sheets

FIG. 9

- Tag: Vendor Specific : wi-FiAll : P2P
    Tag: Number : Vendor specific [221]
    Tag: length: 45
    vendor : wi-FiAll
    vendor specific OUI Type : 9
  - P2P Capability : Device 0x27 Group 0x0
  - P2P Device Info
    Attribute Type : P2P Device Info [13]
    Attribute Length : 33
    P2P Device address : 9a : 0c : 82 : a4 : 2d : 9c (9a : 0c : 82 : a4 : 2d : 9c)
    Config Methods : 0x0188
        .... .... .... ...0 = USBA (Flash Drive) : 0x0000
        .... .... .... ..0. = Ethernet : 0x0000
        .... .... .... .0.. = Label : 0x0000
        .... .... .... 1... = Label : 0x0001
        .... .... ...0 .... = Ecternal NFC Token : 0x0000
        .... .... ..0. .... = Integrated NFC Token : 0x0000
        .... .... .0.. .... = NFC Interface : 0x0000
        .... .... 1... .... = PushButton : 0x0001
        .... ...1 .... .... = Keypad : 0x0001
    Primary Device Type : 000a0050f2040005
    Primary Device Type : Category : 10
    Primary Device Type : OUI : 0050f204
    Primary Device Type : Subcategory : 5
    Number of secondary Device Types : 0
    Device Name attribute type : 0x1011
    Device Name attribute length : 12
    Device Name : Android_7e06

910

FIG. 10
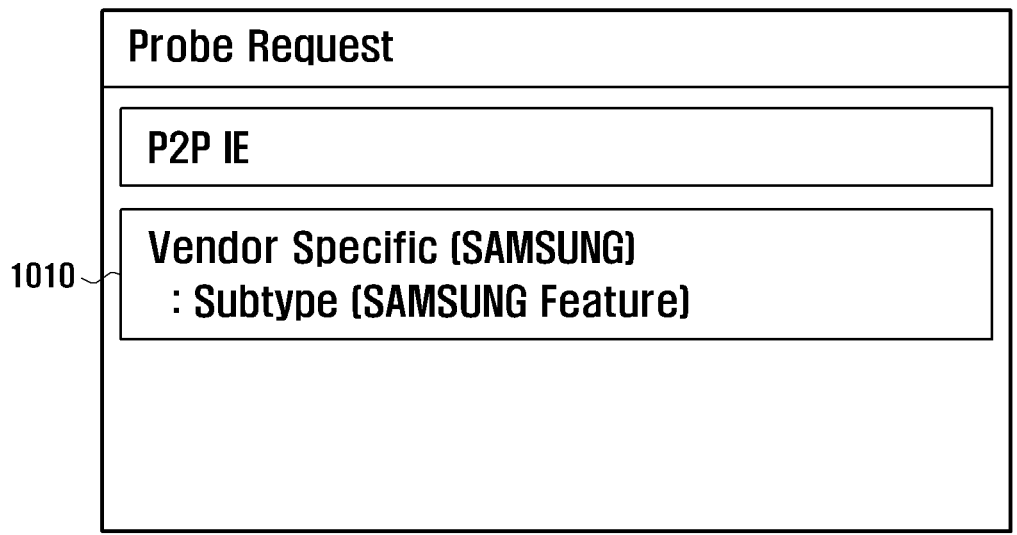
(a)
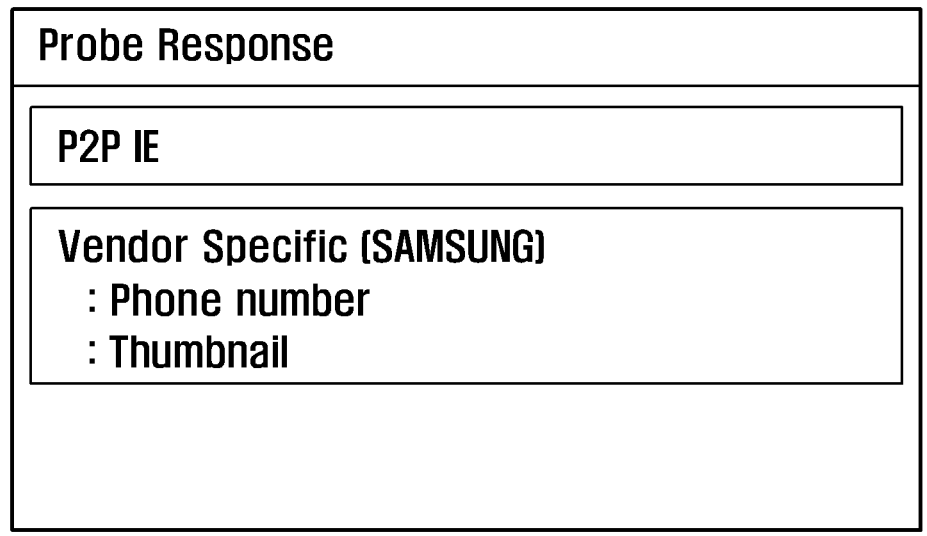
(a)

FIG. 11

- Tag: Vendor Specific : wi-FiAll : P2P
    - Tag: Number : Vendor specific (221)
    - Tag: length: 45
    - vendor : wi-FiAll
    - vendor specific OUI Type : 9
- P2P Capability : Device 0x27 Group 0x0
- P2P Device Info
    - Attribute Type : P2P Device Info (13)
    - Attribute Length : 33
    - P2P Device address : 9a : 0c : 82 : a4 : 2d : 9c (9a : 0c : 82 : a4 : 2d : 9c)
    - Config Methods : 0x0188
        - .... .... .... ...0 = USBA (Flash Drive) : 0x0000
        - .... .... .... ..0. = Ethernet : 0x0000
        - .... .... .... .0.. = Label : 0x0000
        - .... .... .... 1... = Label : 0x0001
        - .... .... ...0 .... = Ecternal NFC Token : 0x0000
        - .... .... ..0. .... = Integrated NFC Token : 0x0000
        - .... .... .0.. .... = NFC Interface : 0x0000
        - .... .... 1... .... = PushButton : 0x0001
        - .... ...1 .... .... = Keypad : 0x0001
    - Primary Device Type : 000a0050f2040005
    - Primary Device Type : Category : 10
    - Primary Device Type : OUI : 0050f204
    - Primary Device Type : Subcategory : 5
    - Number of secondary Device Types : 0
    - Device Name attribute type : 0x1011
    - Device Name attribute length : 12
    - Device Name : Android_7e06
- Tag: Vendor Specific : SAMSUNG
    - Tag: Number : Vendor specific (221)
    - Tag: length: 9
    - vendor : SAMSUNG
    - vendor specific OUI Type : 2

| Tag interpretation : Encrypted Phone Number |
|---|

☐ Tag: Vendor Specific : wi-FiAll : P2P
    Tag: Number : Vendor specific (221)
    Tag: length: 45
    vendor : wi-FiAll
    vendor specific OUI Type : 9
  ⊞ P2P Capability : Device 0x27 Group 0x0
  ☐ P2P Device Info
      Attribute Type : P2P Device Info (13)
      Attribute Length : 33
      P2P Device address : 9a : 0c : 82 : a4 : 2d : 9c (9a : 0c : 82 : a4 : 2d : 9c)
      Config Methods : 0x0188
        .... .... .... ...0 = USBA (Flash Drive) : 0x0000
        .... .... .... ..0. = Ethernet : 0x0000
        .... .... .... .0.. = Label : 0x0000
        .... .... .... 1... = Label : 0x0001
        .... .... ...0 .... = Ecternal NFC Token : 0x0000
        .... .... ..0. .... = Integrated NFC Token : 0x0000
        .... .... .0.. .... = NFC Interface : 0x0000
        .... .... 1... .... = PushButton : 0x0001
        .... ...1 .... .... = Keypad : 0x0001
      Primary Device Type : 000a0050f2040005
      Primary Device Type : Category : 10
      Primary Device Type : OUI : 0050f204
      Primary Device Type : Subcategory : 5
      Number of secondary Device Types : 0
      Device Name attribute type : 0x1011
      Device Name attribute length : 12
      Device Name : Android_7e06
☐ Tag: Vendor Specific : SAMSUNG
    Tag: Number : Vendor specific (221)
    Tag: length: 9
    vendor : SAMSUNG
    vendor specific OUI Type : 2
    Tag interpretation : IMAGE Payload

1210

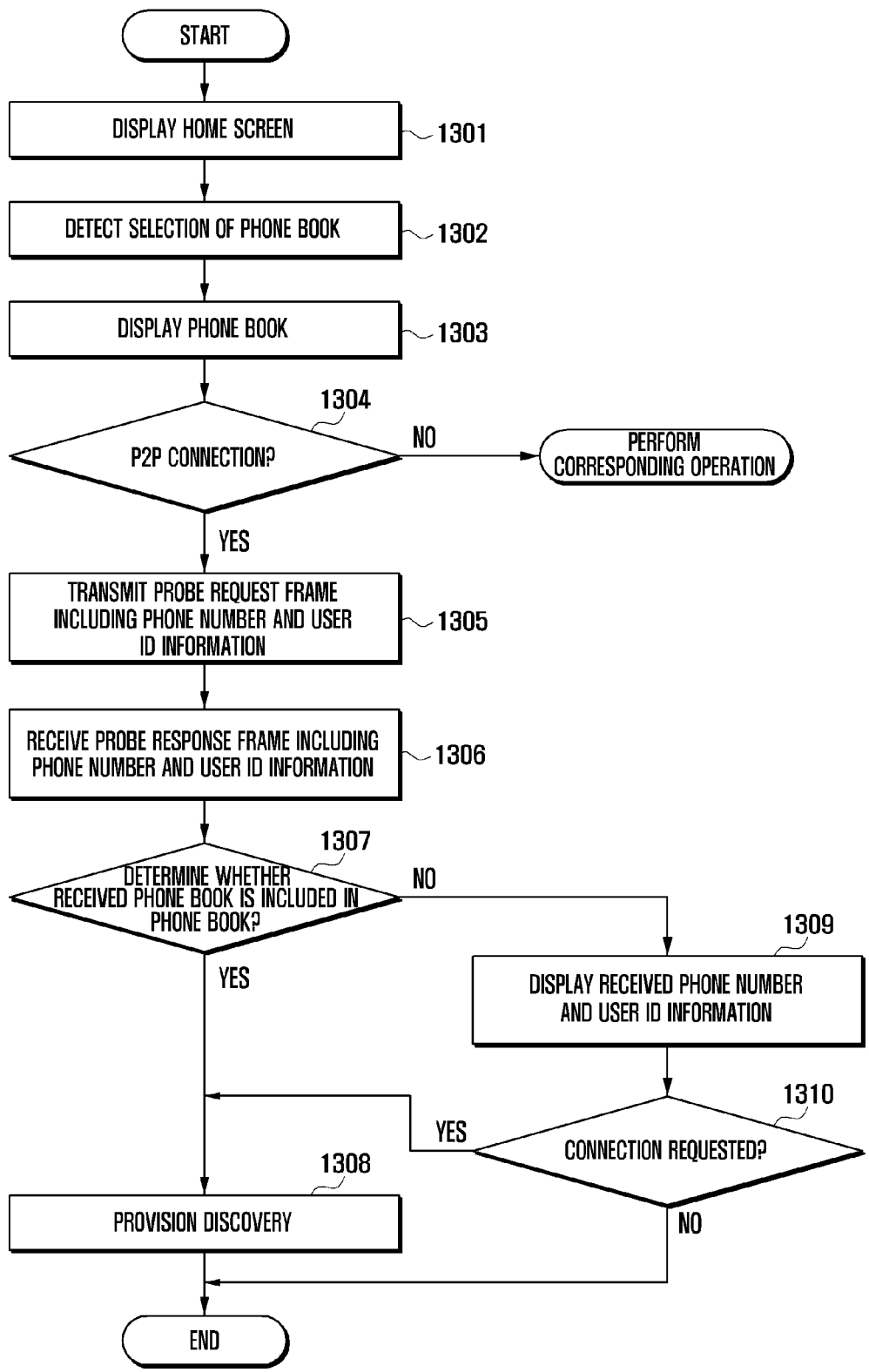

METHOD AND APPARATUS FOR DISCOVERING DEVICE IN WIRELESS COMMUNICATION NETWORK

CLAIM OF PRIORITY

This application claims the benefit under 35 U.S.C. §119(a) of a Korean patent application filed on Feb. 24, 2012 in the Korean Intellectual Property Office and assigned Serial No. 10-2012-0018952, the entire disclosure of which is hereby incorporated by reference.

BACKGROUND OF THE INVENTION

1. Field of the Invention

The present invention relates to a method and an apparatus for discovering a device in a wireless communication network, and more particularly, to a method for discovering a device without an access point (AP), and an apparatus thereof.

2. Description of the Related Art

Among wireless communication technologies, a wireless fidelity (Wi-Fi) direct network technology is a technology which enables Wi-Fi terminals to be connected to each other in a peer-to-peer (hereinafter referred to as 'P2P') fashion without an AP being a medium of an infrastructure network. Most of the existing Wi-Fi technologies are aimed at only connecting to the Internet through a Wireless Local Area Network (WLAN) AP whereby consideration of direct communication between terminals is not addressed. Direct communication between terminals may be achieved through Bluetooth technology. However, the performance quality in transmission distance and transmission speed of Bluetooth technology deteriorates as compared with the Wi-Fi Direct technology.

An existing Wi-Fi technology supports a mode in which direct communication between terminals is possible, which is called an Ad-hoc mode. However, since the Ad-hoc mode is disadvantageous in that security is weak, power consumption is high, and throughput is limited to 11 Mbps, it is rarely used.

The Wi-Fi direct technology supports Wi-Fi Protected Access® 2 (WPA2) to supplement weakness of security. Further, the Wi-Fi Direct technology supports simple connections between terminals using a Wi-Fi Simple Configuration (hereinafter referred to 'WSC'). Moreover, the Wi-Fi direct technology provides an improved power consumption algorithm by supporting IEEE 802.11n to significantly improve throughput as compared with the Ad-hoc mode.

The Wi-Fi direct technology is a protocol manufactured based on IEEE 802.11, and is compatible with a legacy client. The Wi-Fi direct technology may be upgraded in a terminal without changing hardware.

Although the Wi-Fi direct technology has considerable advantages as illustrated above as compared with Bluetooth and Ad-hoc technologies, there is a need for a technology enabling a user to easily recognize a found terminal.

SUMMARY OF THE INVENTION

The present invention has been made in view of the above problems and provides additional advantages, by providing g a method for discovering a device capable of improving a user experience (UX) by enabling a user to easily recognize a found terminal, and an apparatus thereof.

In accordance with an aspect of the present invention, a method for discovering a peer to peer (P2P) device capable of performing P2P communication in a wireless communication network includes: receiving, by a first P2P device a probe request frame from a second P2P device; determining, by the first P2P device, whether a message requesting at least one of a phone number and user identification information is included in the received probe request frame; and transmitting, by the first P2P device, a probe response frame including at least one of the phone number and the user identification information to the second P2P device when the message is included in the received probe request frame.

In accordance with another aspect of the present invention, a method for discovering a peer to peer (P2P) device capable of performing P2P communication in a wireless communication network includes: transmitting, by a first P2P device, a probe request frame including a message requesting a phone number to a second P2P device; receiving, by the first P2P device, a probe response frame including the phone number from the second P2P device having received the message; displaying, by the first P2P device, a contact point information associated with the received phone number from a phone book; and establishing, by the first P2P device, a connection with the second P2P device having transmitted the probe response frame including the phone number when the displayed contact point information is selected.

In accordance with another aspect of the present invention, a an apparatus for discovering a peer to peer (P2P) device capable of performing P2P communication in a wireless communication network includes: a Wi-Fi module for performing a function of an access point or a state in the P2P communication and for transmitting, by a first P2P device, a probe request frame to a second P2P device; and a controller controlling the Wi-Fi module to transmit, by the second P2P device, a probe response frame including at least one of the phone number and the user identification information to the first P2P device when a message requesting at least one of a phone number and user identification information is included in the received probe request frame.

BRIEF DESCRIPTION OF THE DRAWINGS

The above features and advantages of the present invention will be more apparent from the following detailed description in conjunction with the accompanying drawings, in which:

FIGS. 9, 10, 11 and 12 are diagrams illustrating examples of a probe response frame, respectively;

FIG. 13 is a flowchart illustrating a method for using identification information in a wireless communication network according to an exemplary embodiment of the present invention;

DETAILED DESCRIPTION OF EXEMPLARY EMBODIMENTS

A method and an apparatus for discovering a device according to exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

As used herein, the term "peer to peer (P2P) device" refers to a terminal including a Wi-Fi direct technology acting as a GO and a GC in a Wi-Fi direct network. As used herein, the term "P2P group" refers to one terminal set configured by one GO and one or more GCs in the Wi-Fi direct network. The GC is connected to the GO. The GO communicates with a GC, and performs an AP function relaying communication between particularly GCS.

Figure 1:
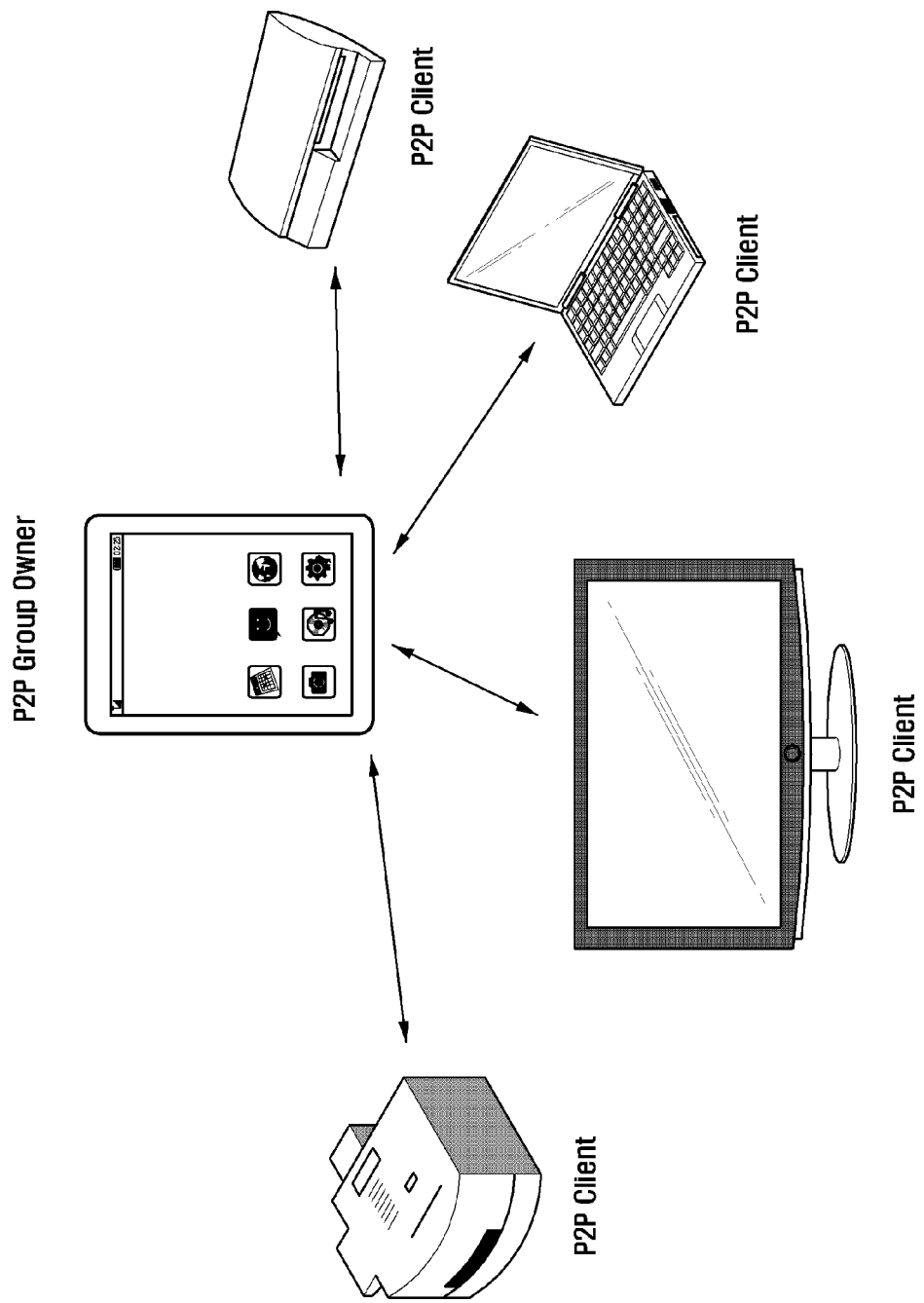
FIG. 1 is a diagram illustrating a network configuration of a P2P group according to an exemplary embodiment of the present invention.

FIG. 1 is a diagram illustrating a network configuration of a P2P group according to an exemplary embodiment of the present invention. Referring to FIG. 1, the GO may connect with a plurality of GCS or may connect with one GC. The number of admissible clients may be determined according to a performance of the GO. Such a performance may be a hardware performance and a software performance, which may be a charging rate of a battery as an example. When a battery of the GO is charged greater than 80%, the GO may be connected with four GCs as shown. If the charging rate of the battery is less than 50%, the GO may be connected with one GC. The number of the GCs connected with the GO may be also determined by the user in environmental setting of the terminal. The P2P device is a terminal including the Wi-Fi direct technology and may include, for example, a portable terminal (e.g., tablet PC, notebook PC), a printer, a projector, and a digital TV.

Figure 2:
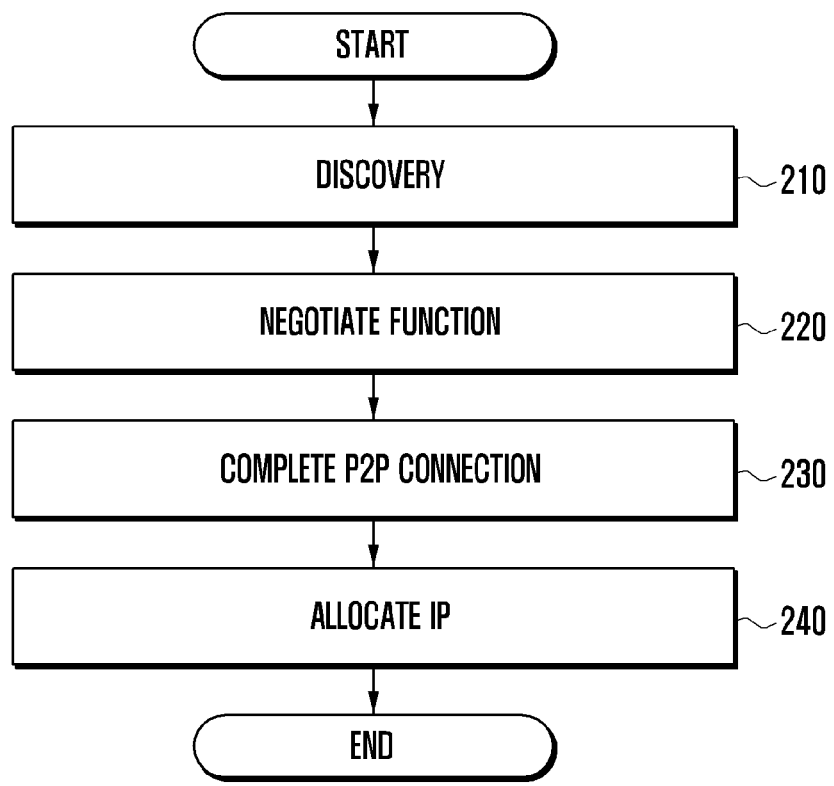
FIG. 2 is a flowchart illustrating a P2P connection method according to an exemplary embodiment of the present invention.

FIG. 2 is a flowchart illustrating a P2P connection method according to an exemplary embodiment of the present invention. Referring to FIG. 2, a P2P device searches a neighboring P2P device, and performs a discovery process connecting with the searched P2P device at step 210. A purpose of the discovery is to search P2P devices such that devices may connect with each other as soon as possible. The discovery operation includes a device discovery and a provision discovery. The device discovery is configured by two steps, namely, a scan step and a find step.

A probe request frame and a probe response frame are used in the device discovery according to the embodiment of the present invention to exchange information between the devices. When the P2P device itself is a GO or in a listen state, the P2P device may respond to a probe request frame received from another P2P device. Further, if the P2P device itself is a GO, it may transmit a beacon frame. If the P2P device is not included in a group, it may be in a listen state. That is, the P2P device in the listen state responds to a received probe request frame.

In operation, the P2P device in the listen state selects a listen channel from a social channel list. For example, according to a Wi-Fi P2P Technical Specification suggested by the Wi-Fi Alliance Technical Committee, channels 1, 6, and 11 may be used as a social channel in 2.4 GHz band. For example, when channel 1 is selected, the P2P device may receive a probe request frame through the channel 1, but may not receive the probe request frame through other channels. When the device discovery starts, the listen channel may be selected and remain until the discovery is terminated. If a preset time elapses, the listen channel may be changed to another channel. A 2.4 GHz band is used and there are a total of 14 channels in the IEEE 802.11. An interval between channels is 5 MHz, each having a 22 MHz band. The channels are not independent from each other but overlap with each other. However, three channels 1, 6, and 11 among the 14 channels do not interfere with each other.

The scan step in the device discovery is a step of searching for a P2P device or a P2P group. Further, the scan step is a step of searching the most suitable channel to set the P2P group. That is, in the scan step, the P2P device scans all supported channels to collect information from a neighboring device or network. In the scan step, the P2P device may not respond to a probe request frame.

The find step in the device discovery is a step in which P2P devices existing in the same channel transceive a message to find each other. The P2P device waits for reception of the probe request frame in the listen state. When the probe request frame is received, the P2P device transmits a probe response frame to a P2P device of the other party. The P2P device may change the listen state to a search state. In a search state, the P2P device transmits the probe request frame and the P2P device of the other party transmits the probe response frame in response to the probe request frame. The probe response frame includes a device name, device attribute information, and vendor information. The P2P device may display the information allowing the user to confirm the information.

The P2P devices searched for each other through the device discovery may be connected to each other. To this end, the P2P device according to the embodiment of the present invention performs a provision discovery with a P2P device of the other party awaiting a connection. When the P2P device attempts a connection with another P2P device in a Personal Identification Number (PIN) or a Push Button Configuration (PBC) mode of WSC, the provision discovery informs a user of the connection attempt. The P2P device receives a provision discovery request frame during the provision discovery, and informs the user of message contents through a pop-up. The pop-up includes information of the P2P device having requested the provision discovery such as a device name. The requested use of the P2P device determines a presence of admittance and a WSC of the connection. To inform the P2P device of the other party of the presence of admittance of the connection, the P2P device transmits a provision discovery response frame to the P2P device of the other party.

When the provision discovery is completed, the P2P device negotiates a function with the P2P device of the other party in step 220. In this procedure, a P2P device determined as the GO performs the function of the AP, and a P2P device determined as a GC performs the function of a station.

After negotiation of the function is completed, the P2P device exchanges information necessary for P2P communication, for example, a network key, an encryption type, a Service Set Identification (SSID), an Authentication type with the P2P device of the other party to complete P2P connection in step 230.

When the P2P connection is completed, the GO drives a Dynamic Host Configuration Protocol (DHCP) server to dynamically allocate an IP address to a GO in step 240. Here, as is generally known in the art, a DHCP is a protocol which enables a network manager (namely, GO) to manage and allocate an IP address of a P2P group to the GC. Since a Wi-Fi direct technology is a communication technology based on an IP address, the GC needs to receive allocation of an IP address. The IP address may be allocated during a discovery or negotiation procedure. Accordingly, the speed of the entire P2P connection may be improved.

Figure 3:
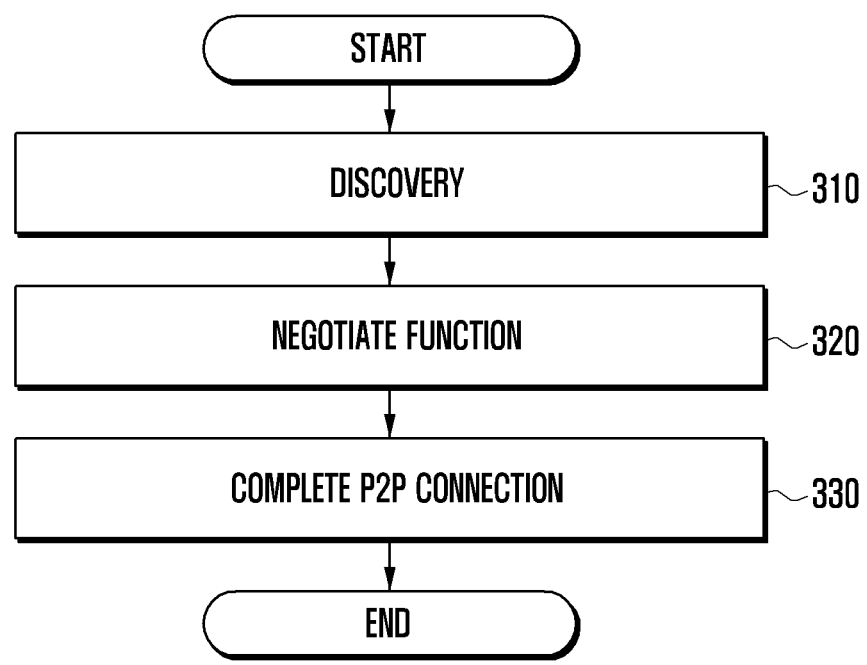
FIG. 3 is a flowchart illustrating a P2P connection method according to another embodiment of the present invention.

FIG. 3 is a flowchart illustrating a P2P connection method according to another embodiment of the present invention. Referring to FIG. 3, a P2P device performs a device discovery for discovering a neighboring P2P device in step 310. Then, the P2P device performs a provisional discovery for connecting with a discovered P2P device in step 310. Particularly, a provision discovery request frame and a provision discovery response frame may include an IP address to be allocated to a GC. Here, the IP address may be a private IP address usable in a local area, namely, in a corresponding P2P group. The P2P device stores a private IP address list. For instance, the private IP address may be "165.213.30.2~254". The P2P device may select an optional private IP address from the private IP address list, and transmits a provision discovery request message including the selected private IP address to another P2P device. Further, The P2P device may transmit a message discovery response frame including a private IP address to another P2P device. Thereafter, during a negotiation procedure, a P2P device determined as a GC allocates a received private IP address as its IP address.

When the provision discovery is completed, the P2P device negotiates a function with the P2P device of the other party in step 320. In this process, a P2P device determined as the GO performs the function of the AP, and a P2P device determined as a GC perform the function of a station. P2P devices in the P2P group transceive a message to determine a GO. In this case, such a message may include an IP address, particularly, a private IP address. That is, the P2P device selects an optional private IP address from a private IP address list, and transmits a message including the selected private IP address to another P2P device. A P2P device determined as a GC as the negotiation result allocates a received private IP address as its IP address.

After negotiation of the function is completed, the P2P device exchanges information necessary for P2P communication, for example, a network key, an encryption type, a Service Set Identification (SSID), an Authentication type with the P2P device of the other party to complete P2P connection in step 330.

Figure 4:
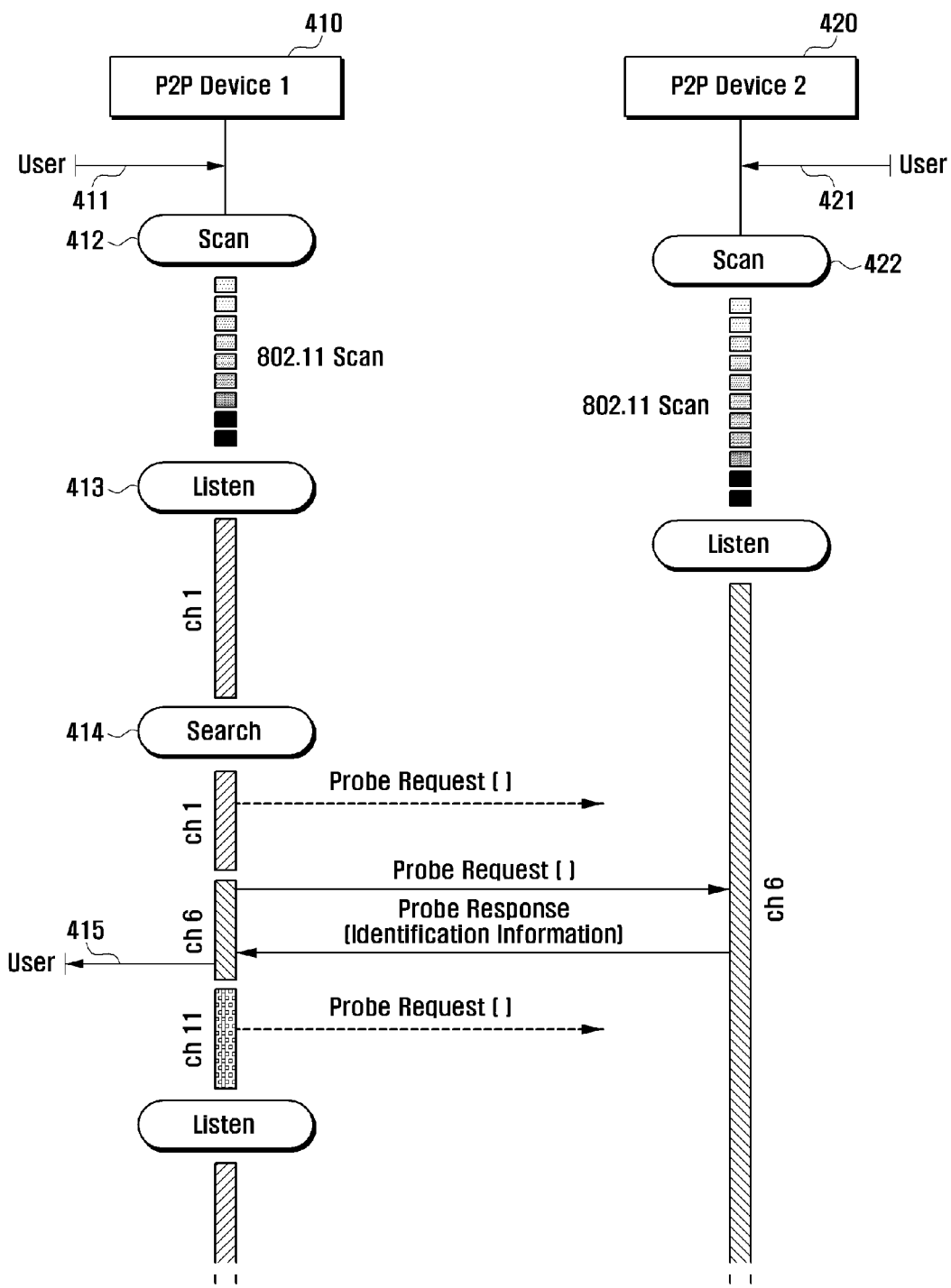
FIG. 4 is a flowchart illustrating a device discovery process according to an exemplary embodiment of the present invention.

FIG. 4 is a flowchart illustrating a discovery process according to an exemplary embodiment of the present invention.

As shown, a user of the first P2P device 410 commands the first P2P device 410 to perform P2P connection in step 411. That is, the user operates an input unit included in the first P2P device 410, for example, a touch screen for the P2P connection. Then, the touch screen transfers an input touch event to a controller of a device. The controller detects the P2P connection request, namely, a command of device discovery from the input touch event. Then, the first P2P device 410 firstly performs a scan in response to the command of the device discovery in step 412. For example, the first P2P device 410 scans channels 1, 6, and 11 of IEEE 802.11 in sequence to collect information from a neighboring P2P device. After completing the scan operation, the first P2P device 410 performs a find step. Meanwhile, a user of the second P2P device 420 commands the second P2P device 420 to perform the discovery in step 421. Accordingly, the second P2P device 420 initially performs a scan in response to a command of the user in step 422. After completing the scan, the second P2P device 420 performs a find step.

The first P2P device 410 enters a listen state in step 413. The first P2P device 410 selects channel 1 as the listen channel. If a preset time elapses, the first P2P device 420 enters a search state in step 414. The first P2P device 410 firstly selects channel 1 to transmit a probe request frame in the search state. When there is no response, the first P2P device 410 selects channel 6 to transmit the probe request frame. In this case, the second P2P device 420 is in a listen state with respect to channel 6. The second P2P device 420 receives a probe request frame through channel 6, and transmits a probe response frame through the channel 6 in response thereto. The first P2P device 410 receives a probe response frame from the second P2P device 410 through the channel 6. In response, the first P2P device 410 displays information of the probe response frame, for example, a device name, device attribute information, vendor information such that the user may confirm the foregoing information. The user may determine the presence of admittance of connection based on the information in step 415.

Figure 5:
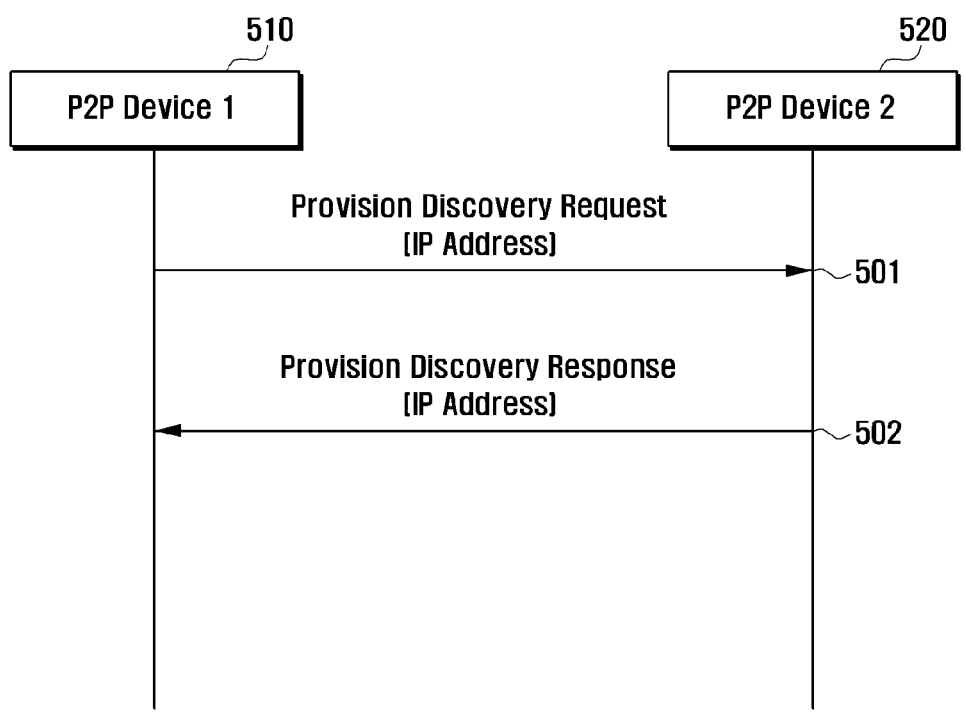
FIG. 5 is a flowchart illustrating a provision discovery process according to an exemplary embodiment of the present invention.

FIG. 5 is a flowchart illustrating a provision discovery process according to an exemplary embodiment of the present invention. Referring to FIG. 5, a user of the first P2P device 510 commands the first P2P device 510 to admit connection. For example, the user operates an input unit included in the first P2P device 510, for example, a touch screen for P2P connections. Then, the touch screen transfers an input touch event to a controller which is a command for the provision discovery from the input touch event.

The first P2P device 510 initially transmits a provision discovery request frame to the second P2P device 520 in step 501. Here, the provision discovery request frame includes an IP address. The IP address in the provision discovery request frame may be a private IP address. Particularly, the private IP address included in the provision discovery request frame may be one of "165.213.30.2~254".

The second P2P device 520 transmits a provision discovery response frame to the first P2P device 510 in response to reception of the provision discovery request frame in step 502. In this case, according to the present invention, the provision discovery response frame may include an IP address, namely, a private IP address.

Figure 6:
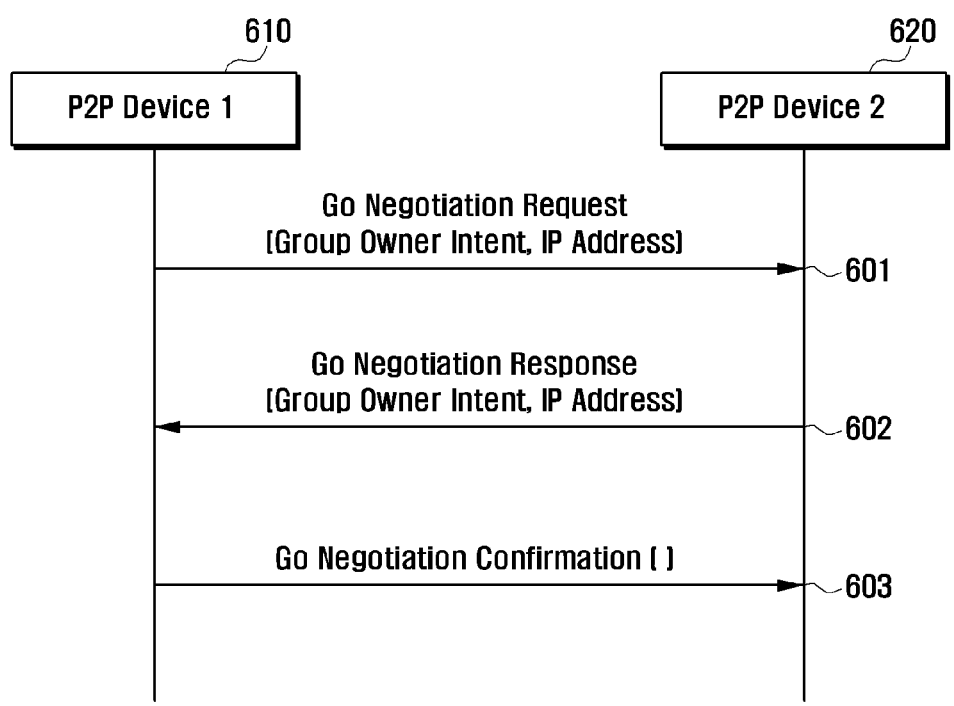
FIG. 6 is a flowchart illustrating a negotiation process according to an exemplary embodiment of the present invention.

FIG. 6 is a flowchart illustrating a negotiation procedure according to an exemplary embodiment of the present invention. Referring to FIG. 6, the first P2P device 610 and the second P2P device 620 are in a state of perform discovery to find each other. The first P2P device 610 transmits a GO Negotiation Request frame to the second P2P device 620 in step 610. According to the present invention, the GO negotiation request frame includes a P2P Information Element (IE), WSC information (IE), an IP address.

The IP address of the GO negotiation request frame may be IP address. The IP address of the GO negotiation request frame may be one of "165.213.30.2~254".

That is, the first P2P device 610 may optionally select one private IP address from a private IP address list, and transmits the GO negotiation request frame, including the selected private IP address. However, for example, "165.213.30.2~10" is a share to be allocated to a third P2P device, and may be excluded in the selection. Here, the third P2P device is a P2P device requesting entry to a P2P group as a P2P client after negotiation is completed. That is, a P2P device determined as the GO may allocate one of the "165.213.30.2~10" to the third P2P device.

The P2P information of the GO negotiation frame may include device information, a Configuration Timeout, a Listen Channel, a listen channel list, and a Group Owner Intent (hereinafter referred to as 'GOI'). Here, the GOI is a numeric value indicating intention of a P2P device, namely, a first P2P device 610 having transmitted a corresponding message becoming a GO. That is, when the GOI value is great, there is a high possibility in which a corresponding P2P device is determined as a GO. The range of the GOI may previously be set. For example, 0~15 may be the range of the GOI. A P2P device selects a value from the GOI range based on its performance (e.g, a charging rate of a battery) in a GO negotiation request frame, and transmits the GO negotiation request frame including the selected value. For example, when the P2P device receives its power supply from a notebook PC and an external commercial power supply, it may select 15 as the GOI.

The second P2P device 620 receives a GO negotiation request frame from a first P2P device 610, and transmits a GO negotiation response frame in response thereto in step 602. According to the present invention, the GO negotiation response frame includes a P2P Information Element (IE), WSC information (IE), and an IP address.

As describe above, an IP address of the GO negotiation response frame may be a private IP address. Particularly, the private IP address included in the GO negotiation response frame may be one of "165.213.30.2~254". However, "165.213.30.2~10" may be omitted because of the foregoing reason. That is, "165.213.30.2~10" is a shared to be allocated to a third P2P device and may be excluded in the selection. Here, the third P2P device is a P2P device requesting an entry to a P2P group as a P2P client after negotiation is completed. That is, a P2P device determined as the GO may allocate one of the "165.213.30.2~10" to the third P2P device. P2P information of the GO negotiation response frame may include device information, a Configuration Timeout, a Listen Channel, a listen channel list, and a GOI.

As described above, the first P2P device 610 and the second P2P device 620 exchange the GOI to determine the GO. For example, when the GOI selected by the first P2P device 610 is 10 and the GOI selected by the first P2P device 610 is 5, the first P2P device 610 is determined as the GO and the second P2P device 620 is determined as a GC. Accordingly, the first P2P device 610 performs a function of an AP in a corresponding P2P group, and the second P2P device 620 performs a function of a station in the corresponding P2P group. Further, because the first P2P device 610 is determined as the GO, the second P2P device 620 allocates an IP address received from the first P2P device 610 as its IP address.

The first P2P device 610 transmits a GO Negotiation Confirmation Frame the second P2P device 620 to notify that it is determined as its GO in step 603.

Figure 7:
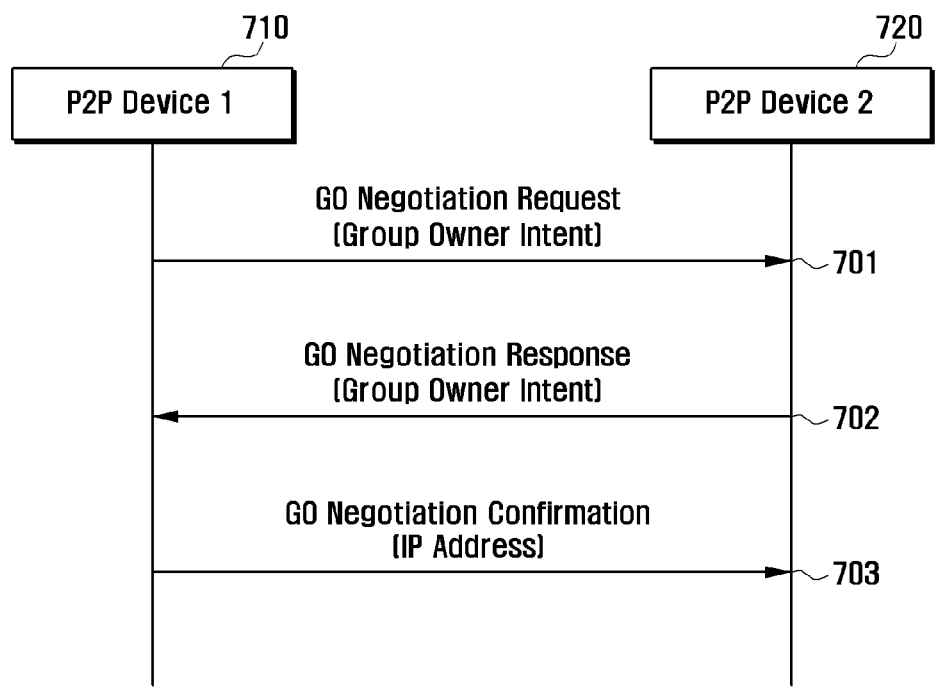
FIG. 7 is a flowchart illustrating a negotiation process according to another embodiment of the present invention.

FIG. 7 is a flowchart illustrating a negotiation procedure according to another embodiment of the present invention. Referring to FIG. 7, the first P2P device 710 and the second P2P device 720 are in a state of perform discovery to find each other. The first P2P device 710 transmits a GO Negotiation Request frame to the second P2P device 720 in step 701. According to the present invention, the GO negotiation request frame includes a P2P Information Element (hereinafter referred to as 'IE'), and WSC IE. The P2P information of the GO negotiation frame may include device information, a Configuration Timeout, a Listen Channel, a listen channel list, and a GOI. Here, the GOI is a numeric value indicating the intention of a P2P device, namely, a first P2P device 710 having transmitted a corresponding message becoming a GO. The GOI was described above with reference to steps 701 to 703. That is, the first P2P device 710 transmits a first GOI to the second P2P device 720 in step 701. The second P2P device 720 transmits a second GOI to the first P2P device 710 in step 702. For example, when the first GOI is greater than the second GOI, the first P2P device 710 may be determined as a GO.

The second P2P device 720 receives a GO negotiation request frame from a first P2P device 710, and transmits a GO negotiation response frame in response thereto in step 702. According to the present invention, the GO negotiation response frame includes a P2P IE and a WSC IE.

As described earlier, the first P2P device 710 and the second P2P device 720 exchange the GOI to determine the GO. For example, the GOI selected by the first P2P device 710 is greater than that selected by the second P2P device 720, so that the first P2P device 710 may be determined as a GO. Accordingly, the first P2P device 710 performs a function of an AP in a corresponding P2P group, and the second P2P device 720 performs a function of a station in the corresponding P2P group.

The first P2P device 710 transmits a GO Negotiation Confirmation Frame to the second P2P device 720 to notify that it is determined as its GO in step 703. In particular, according to the present invention, the GO Negotiation Confirmation Frame may include an IP address. Here, as described above, the IP address may be a private IP address. The second P2P device 720 allocates an IP address received from the first P2P device 710 determined as the GO as its IP address.

Figure 8:
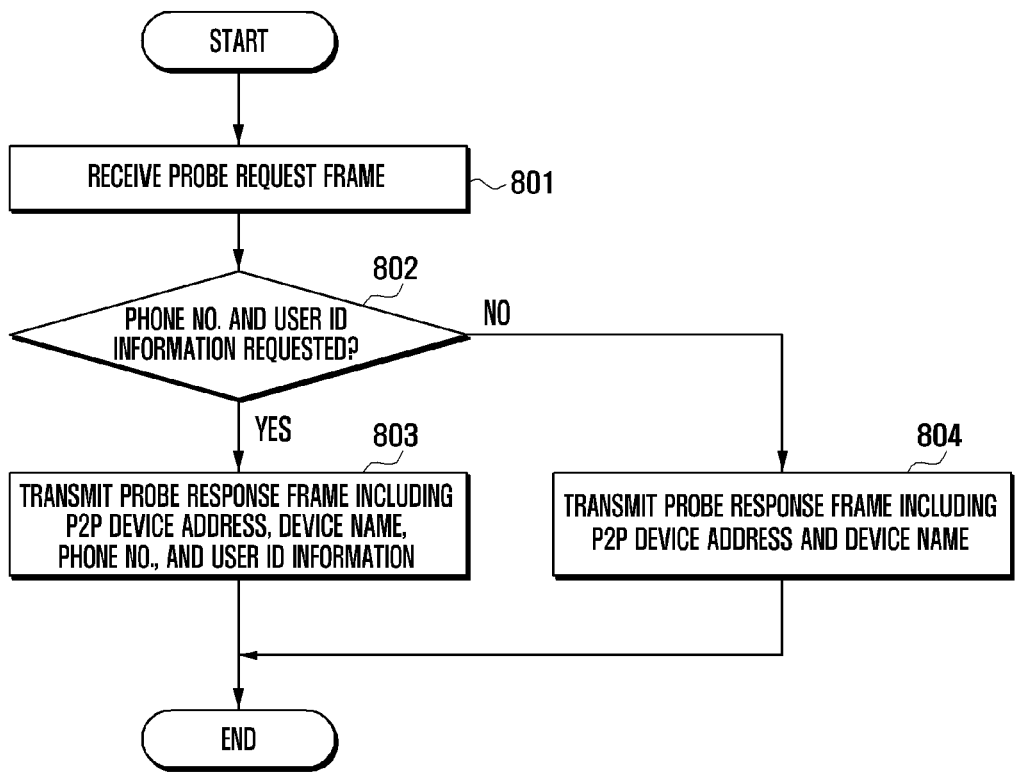
FIG. 8 is a flowchart illustrating a method for transmitting identification information in a wireless communication network according to an exemplary embodiment of the present invention.

FIG. 8 is a flowchart illustrating a method for transmitting identification information in a wireless communication network according to an exemplary embodiment of the present invention. Referring to FIG. 8, a P2P device receives a probe request frame from another P2P device in step 801. The P2P device determines whether a message requesting "a phone number and user ID information" is included in the received probe request frame in step 802.

When the message requesting "phone number and user ID information" is included in the received probe request frame, the P2P device transmits a probe response frame including a P2P device address, a device name, a phone number, and user ID information in step 803. Here, the user ID information may include an image. Such an image may be set by a user in environmental setting for P2P connection. The P2P device displays a home screen, which may include an icon corresponding to environmental setting. A user may select an icon corresponding to the environmental setting. Then, the P2P device detects the selection of the user for an icon corresponding to the environmental setting from the home screen. Further, the P2P device displays an environmental setting screen. In a displayed state of the environmental setting screen, the user may operate an input unit (e.g., touch screen) of the P2P device to set a profile of the user to be used for P2P connection. Particularly, the user may select a profile image to be used for P2P connection from a photograph folder. In addition to the image, the user may include a name, an address, and an e-mail in the profile.

When the message requesting "phone number and user ID information" is not included in the received probe request frame, the P2P device transmits a probe response frame including a P2P device address and a device name in step 804. That is, the probe request frame at step 804 may not include a phone number and user ID information. When the phone number and the user ID information are included in all probe response frames, the size of the frame may be increased and the transmission of the frame may be inefficient. Only when the phone number and the user ID information are requested, a probe response frame including the phone number and the user ID information may be transmitted.

FIGS. 9 to 12 are diagrams illustrating examples of a probe response frame, respectively. Referring to FIG. 9, when the message requesting the phone number and the user ID information are not included in the probe request frame, the P2P device may transmit a probe response frame including a device name 910. That is, the probe response frame may not include a phone number and user ID information.

Referring to FIG. 10, a P2P device may receive a probe request frame including a message 1010 requesting a phone number and user ID information as illustrated in FIG. 10(a). In response, the P2P device may transmit a probe response frame including a phone number and an image (e.g., thumbnail) as illustrated in FIG. 10(b).

Referring to FIG. 11, the P2P device may transmit a probe response frame only including a phone number 1110 except for the user ID information. For example, when the other party requests only the phone number, the P2P device transmits only the phone number. Further, when the size of a user profile image exceeds a preset size of a frame, the P2P device may transmit only the phone number. According to a Wi-Fi direct specification, the size of the probe response frame may be restricted within 1500 bytes. Although it is assumed that only an image is included in the probe response frame, when a corresponding image exceeds 1500 bytes, it may not be transmitted. Accordingly, when the size of the profile image is too big, the P2P device may transmit only a phone number. The P2P device may resize a profile image smaller and transmit the resized profile image. Further, it is apparent that only a payload except for a header in the small resized profile image may be transmitted. Further, a phone number may be encrypted and the encrypted phone number may be transmitted for privacy protection. The P2P device having received the encrypted phone number may decode and display the encrypted phone number.

Referring to FIG. 12, the P2P device may transmit a probe response frame including only an image 1210 except for a phone number. In particular, the P2P device may transmit only a payload except for a header in an image to reduce the size of a probe response frame to be transmitted. For example, the user may set an environment such that a phone number is not transmitted for privacy of the user. That is, when transmission prohibition of the phone number is set in environmental setting, the P2P device may transmit an image except for the phone number, or more particularly, only a payload. As generally known in the art, the image includes a header and a payload. Here, the header includes format information, size information, and palette information of a corresponding image. When knowing a header of the received payload, a P2P device having received the payload may combine the known head with the received payload to restore the image. Further, the P2P may display the restored image.

FIG. 13 is a flowchart illustrating a method for using identification information in a wireless communication network according to an exemplary embodiment of the present invention.

Referring to FIG. 13, a P2P device displays a home screen in step 1301. Here, the home screen includes an icon corresponding to a phone book. A user may operate an input unit included in the P2P device, for example, a touch screen to activate an icon corresponding to the phone book. In response, the P2P device detects selection of the phone book in step 1302, and the P2P device displays the phone book in step 1303. Here, the phone book includes a plurality of contact point information. Each contact point information may include a phone number, a recipient name, an image, an e-mail address, and a home page address. In the embodiment, the user may perform a P2P connection through the phone book. That is, the P2P device detects the selection of one contact point from the phone book. Then, the P2P device may detect a request of P2P connection to a P2P device corresponding to a selected contact point in step 1304 from the user. When a function other than the P2P connection, for example, a call request is detected at step 1304, the P2P device performs a corresponding function, namely, attempts a call to a terminal of the selected contact point.

When the request of the P2P connection by the user is detected at step 1304, the P2P device performs the foregoing device discovery. Particularly, the P2P device transmits a probe request frame including a phone number and user ID information in step 1305. Further, the P2P device receives a probe response frame including a phone number and user ID information in step 1306. Thereafter, the P2P device determines whether the received phone number is included in the phone book in step 1307. When the received phone number is included in the phone book, particularly, when the received phone number corresponds to the selected contact point, the P2P device directly performs a provision discovery process in step 1308. That is, the P2P device connects with a P2P device having transmitted the phone number in step 1308. When the received phone book is not included in the phone book, the P2P device displays the received phone number and user ID information in step 1309. The user may recognize who is the other party through user ID information. The P2P device may detect a connection request with a P2P device having transmitted a phone number in step 1310. When the connection request with a P2P device having transmitted a phone number is detected at step 1310, the process goes to step 1308. When the connection request with a P2P device having transmitted a phone number is not detected (that is, when the user does not want connection with the P2P device having transmitted a phone number), P2P connection is not performed.

Figure 14:
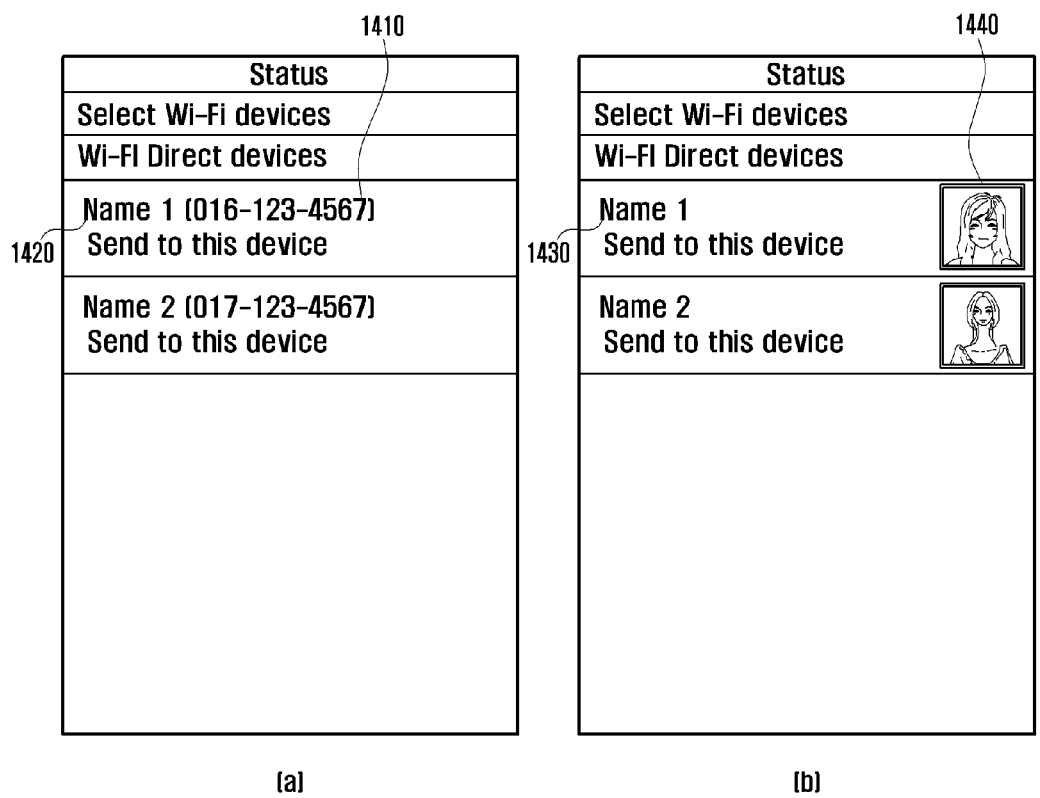
FIG. 14 is a diagram illustrating identification information of a discovered P2P device.

FIG. 14 is a diagram illustrating identification information of a discovered P2P device. Referring to FIG. 14(a), a P2P device may receive a probe response frame including a phone number. Further, the P2P device determines whether a received phone number is included in a phone book. When the received phone number is included in the phone book, the P2P device may display the received phone number 1410 and contact point information (e.g., recipient name 1420) associated with the received phone number 1410. As shown in FIG. 14(a), when one of two discovered P2P devices is selected by the user, the P2P device connects with a P2P device selected by the user.

Alternatively, referring to FIG. 14(b), the P2P device may receive a probe response frame including a phone number and an image. Further, the P2P device determines whether the received phone number is included in a phone book. When the received phone number is included in the phone book, the P2P device may display contact point information (e.g., a recipient name 1430) and a received image 1440.

Figure 15:
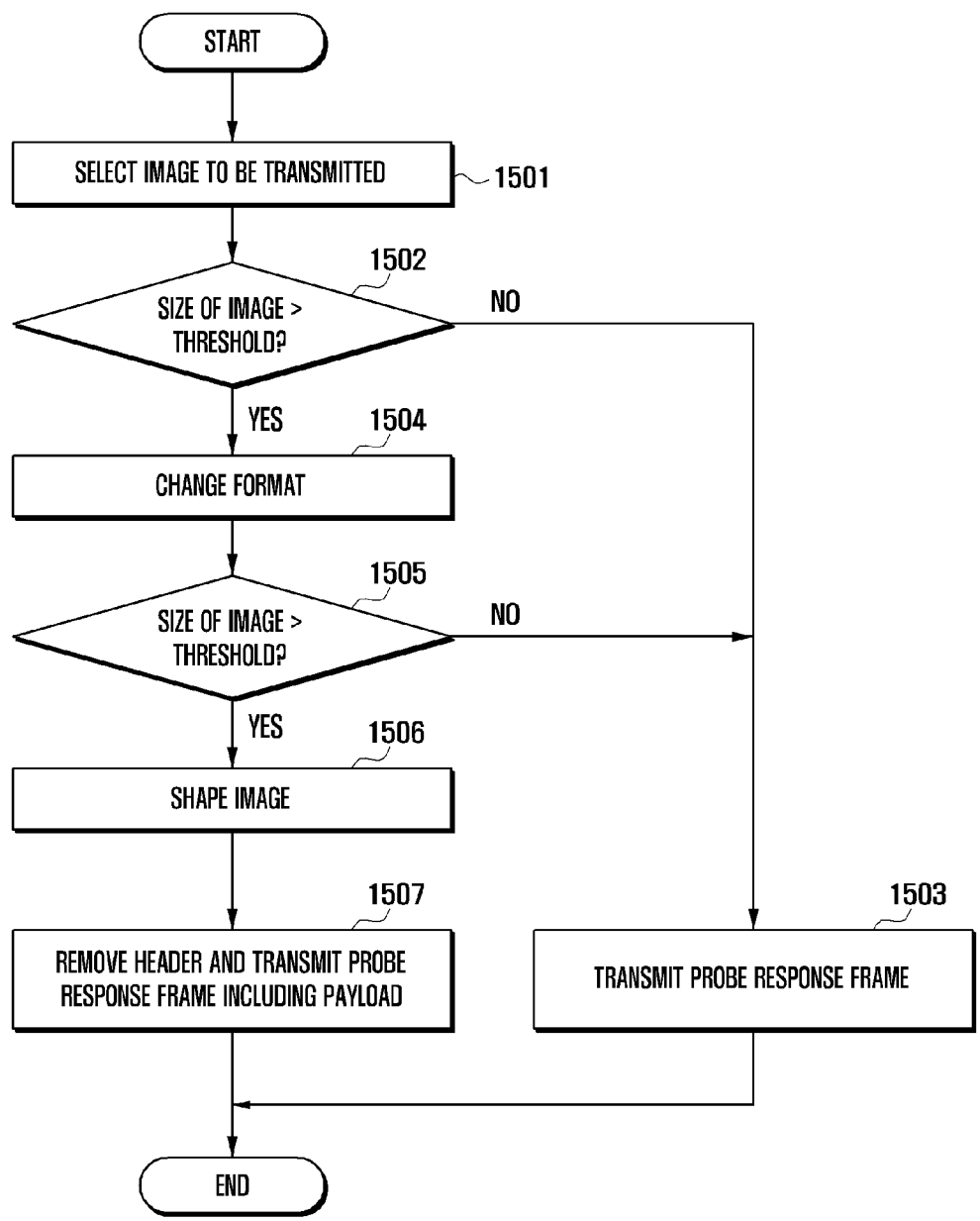
FIG. 15 is a flowchart illustrating a method for transmitting identification information in a wireless communication network according to another embodiment of the present invention.

FIG. 15 is a flowchart illustrating a method for transmitting identification information in a wireless communication network according to another embodiment of the present invention. Referring to FIG. 15, when the probe request frame is received, a P2P device selects an image to be transmitted in step 1501. For instance, the P2P device may select a profile image set by the user as the image to be transmitted. The P2P device determines whether the size of the selected image exceeds a preset first threshold (e.g., 1024 bytes) in step 1502.

When the size of the selected image is less than or equal to the preset first threshold, the P2P device transmits a probe response frame including the selected image in step 1503.

When the size of the selected image exceeds the preset first threshold, the P2P device changes a format of the selected image in step 1504. For instance, the P2P device may change the format of the selected image from a Joint Photographic coding Experts Group (JPEG) to a Graphic Interchange Format (GIF) 89a using 8 bit color.

The P2P device determines whether the size of the image whose format is changed exceeds a preset second threshold in step 1505. The second threshold at step 1505 may be the same as the first threshold at step 1502 or it may be different. When the size of the image whose format is changed is less than or equal to the second threshold, the P2P device transmits a probe response frame including the image whose format is changed. When the size of the image whose format is changed exceeds the second threshold, the P2P device shapes the selected image or the image whose format is changed in step 1506. The P2P device according to the present invention stores image header information. The image header information may include format information, image size information and image palette information. For example, the format information may be GIF 89a, the image size information may be 36 pixels, and the image palette information may be a gray image. As described above, the P2P device changes a format of a selected image to GIF 89a, resizes the size of the selected image to 36 pixels, and a palette of the selected image to a gray image. As mentioned above, if all the images are shaped, payloads of images differ from each other but all headers are the same as each other. The P2P device removes a header from the shaped image, and transmits a probe response frame including only a payload in step 1507. When knowing a header of the received payload, a P2P device having received the payload may combine the known head with the received payload to restore the image, and display the restored image.

As described above, the teachings of the present invention is applicable of P2P electronic device in the various forms. In particular, the P2P device of the present invention is applicable to a portable terminal. It will be apparent that the portable terminal is applicable to various information and communication devices and multi-media device such as a portable phone, a smart phone, a tablet PC, a net book PC, a notebook PC, a Portable Multimedia Player (PMP), an electronic book (e-book) reader, a Personal Digital Assistant (PDA), a digital broadcasting player, a music player (e.g., MP3 player), a portable game terminal, and application devices thereof.

Figure 16:
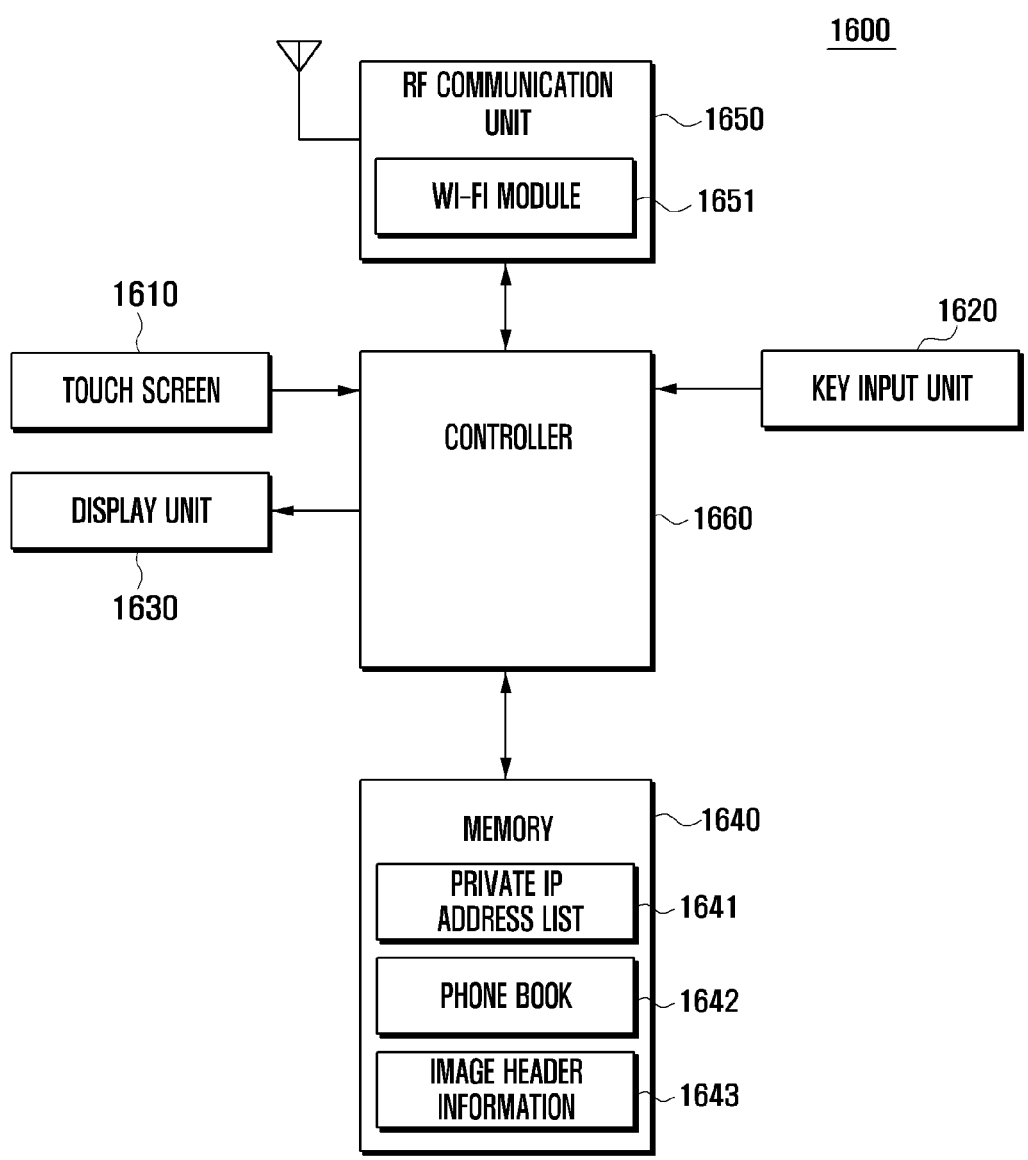
FIG. 16 is a block diagram illustrating a configuration of a portable terminal according to an exemplary embodiment of the present invention.

FIG. 16 is a block diagram illustrating a configuration of a portable terminal according to an exemplary embodiment of the present invention. As shown, a portable terminal 1600 according to the present invention may include a touch screen 1610, a key input unit 1620, a display unit 1630, a memory 1640, a radio frequency (RF) communication unit 1650, and a controller 1660.

The touch screen 1610 is mounted in front of the display unit 1630, generates a touch event in response to a user gesture input thereto. The controller 1660 may detect the touch event input from the touch screen 1610 to control the foregoing components.

The key input unit 1620 may include a plurality of input keys and function keys for receiving input of numerals and character information and for setting various functions. The key input unit 1620 generates and transfers a key signal associated with user setting and function control of the portable terminal 1600 to the controller 1660. The controller 1660 controls the foregoing components in response to the key signal.

The display unit 1630 converts image data input from the controller 1660 into an analog signal, and displays the analog signal under control of the controller 1660. That is, the display unit 1630 may provide various screens according to the use of the portable terminal, for example, a lock screen, a home screen, an application execution screen, a menu screen, a keypad screen a message creation screen, and an Internet screen. The display unit 1630 may be configured by a flat panel display such as a Liquid Crystal Display (LCD), an Organic Light Emitted Diode (OLED), or an Active Matrix Organic Light Emitted Diode (AMOLED).

The memory 1640 may store an operating system (OS), applications necessary for the invention, and various data. The memory 1640 may chiefly include a program area and a data area. The data area of the memory 1640 may store data generated by the portable terminal 1600 or data downloaded from the outside, namely, images, documents, video, messages, emails, music, and effect sounds. Further, the data area may store the screen displayed on the display unit 1630. Moreover, the data area may temporarily store data which the user copies messages, photographs, web pages, or documents for copy and paste. In addition, the data area may store various setting values (e.g., screen brightness, presence of vibration when a touch occurs, presence of automatic rotation of a screen) for operating the portable terminal. Further, the data area may include a private IP address list 1641, a phone book 1642, and image header information 1643. The program area of the memory 1640 may store an operating system (OS) for booting the portable terminal and the foregoing components, and various applications. In particular, the program area stores programs associated with an operation and control of a Wi-Fi direct terminal such as device discovery, provision discovery, and negotiation.

The RF communication unit 1650 performs a voice call, an image call or data communication under control of the controller 1660. The RF communication unit 1650 may include an RF transmitter up-converting a frequency of a transmitted signal and amplifying the signal and an RF receiver low-noise-amplifying a received signal and down-converting the signal. Further, the RF communication unit 1650 may include mobile communication modules (e.g., a 3-Generation mobile communication module, a 3.5-Generation mobile communication module, or a 4-Generation mobile communication module, etc.) and a Wi-Fi module.

The Wi-Fi module 1651 supports wireless communication based on an IP of the portable terminal 1600. In the present invention, the Wi-Fi module 1651 performs a function of an AP or a station under control of the controller 1660. In other words, the Wi-Fi module 1651 acts as a GO or a GC under control of the controller 1660.

The Wi-Fi module 1651 performs a device discovery operation, a provision discovery operation, and negotiation. When a probe request frame is received, the Wi-Fi module 1651 may transmit a probe response frame including at least one of a phone number and user ID information under control of the controller 1660.

The Wi-Fi module 1651 may include an IP address in a Provision Discovery Request Frame, a Provision Discovery Response Frame, a GO Negotiation Request Frame, a GO Negotiation Response Frame, or a GO Negotiation Configuration Frame, and transmit the corresponding frame under control of the controller 1660. Further, the Wi-Fi module 1651 may receive the IP address included in the Provision Discovery Request Frame, the Provision Discovery Response Frame, the GO Negotiation Request Frame, the GO Negotiation Response Frame, or the GO Negotiation Configuration Frame, and transfer the received IP address to the controller 1660.

The controller 1660 controls an overall operation of the portable terminal 1600, signal flow between internal components of the portable terminal 1600, and processes data. Further, the controller 1660 controls power supply to the internal components in a battery. Moreover, the controller 1660 executes various applications stored in the program area.

The controller 1660 may receive an event from the touch screen 1610 or the key input unit 1620, and detect command of the discovery from the received event. The controller 1660 controls the Wi-Fi module 1651 to perform the device discovery in response to the command of device discovery. The controller 1660 controls the Wi-Fi module 1651 to perform the provision discovery in response to the command of the provision discovery.

The controller 1660 may select a private IP address to be transmitted from a private IP address list 1641, and control the Wi-Fi module 1651 to transmit the selected private IP address. The controller 1660 may receive the private IP address from an external device, namely, a P2P device through the Wi-Fi module 1651. When the portable terminal 1600 is determined as a GC after a negotiation, the controller 1660 allocates the received private IP address as an IP address of the portable terminal 1600, and operates the Wi-Fi module 1651 as a GC. As a negotiation result, when the portable terminal 1600 is determined as a GO, the controller 1660 operates the Wi-Fi module 1651 as a GO.

The controller 1660 may control a display unit 1630 to display a phone book 1642. Further, the controller 1660 may detect the selection of one contact point from the phone book 1642. The controller 1660 may detect a request of P2P connection (e.g., touch on contact point) to a P2P device corresponding to a selected contact point. When the request of the P2P connection is detected, the controller 1660 may control the Wi-Fi module 1651 to perform P2P connection with a P2P device corresponding to a selected contact point.

The controller 1660 may control a Wi-Fi module 1651 to transmit a probe request frame including a phone number and a user ID information request message. When the probe request frame including the phone number is received, the controller 1660 may extract contact point information associated with the received phone number from the phone book 1642, and control the display unit 1630 to display the extracted contact point information.

When receiving a probe response frame including an image payload, the controller 1660 may restore an image with reference to image header information 1643 to restore an image, and control the display unit 1630 to display the restored image. The controller 1660 shapes an image with reference to the image header information 1643, and removes a header from the shaped image. Further, the controller 1660 may include a remainder from which a header is removed, a payload in a probe response frame, and control the Wi-Fi module 1651 to transmit the probe response frame.

Meanwhile, the portable terminal 1600 may further include constructions that are not mentioned such as a digital broadcasting module (e.g., DMB module), a GPS module, and a camera module.

The foregoing method for allocating an IP address of the present invention may be implemented in an executable program command form by various computer means and be recorded in a computer readable recording medium. In this case, the computer readable recording medium may include a program command, a data file, and a data structure individually or a combination thereof. In the meantime, the program command recorded in a recording medium may be specially designed or configured for the present invention or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. Further, the program command includes a machine language code created by a complier and a high-level language code executable by a computer using an interpreter. The foregoing hardware device may be configured to be operated as at least one software module to perform an operation of the present invention.

Although a method and apparatus for allocating an IP address according to exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for discovering a peer to peer (P2P) device capable of performing P2P communication in a wireless communication network, the method comprising:
  receiving, by a first P2P device a probe request frame from a second P2P device;
  determining, by the first P2P device, whether a message requesting user identification information is included in the probe request frame; and
  selecting an image from stored images and transmitting, by the first P2P device, a probe response frame including the selected image to the second P2P device when the message is included in the probe request frame.

2. The method of claim 1, further comprising:
  restoring and displaying the image based on a stored image header information.

3. The method of claim 1, wherein the transmitting of the probe response frame comprises:
  determining whether a size of the selected image exceeds a preset first threshold; and
  transmitting the selected image when the size of the selected image is less than or equal to the preset first threshold.

4. The method of claim 3, wherein the transmitting of the probe response frame comprises:
  changing a format of the selected image when the size of the selected image exceeds the preset first threshold; and
  transmitting the image whose format is changed when the size of the image whose format is changed is less than or equal to a preset second threshold.

5. The method of claim 4, wherein the transmitting of the probe response frame comprises:
  shaping the selected image or the image whose format is changed based on a stored image header information when the size of the image whose format is changed exceeds the preset second threshold; and
  transmitting a payload except for a header from the shaped image.

6. The method of claim 5, wherein the image header information includes at least one of format information, image size information, and image palette information.

7. The method of claim 1, wherein the transmitting of the probe response frame comprises:

shaping the selected image based on a stored image header information; and transmitting a payload except for a header from the shaped image.

8. The method of claim 1, further comprising: transmitting the probe request frame including the message while device phone book is displayed.

9. The method of claim 8, further comprising:

receiving the probe response frame including a phone number; and displaying contact point information from the phone book associated with the user identification information.

10. The method of claim 8, further comprising:

receiving by a second P2P device the probe response frame including the user identification information; and establishing a connection with the second P2P when the user identification information is associated with a request to establish a P2P connection.

11. A device communication method, comprising:

receiving, by a first wireless communication device, a message from a second wireless communication device in a wireless communication network; and selecting an image from stored images and transmitting, by the first wireless communication device, information including a user identification information further including the image to the second wireless communication device when a request for the information is included in the message.

12. A method for discovering a peer to peer (P2P) device capable of performing P2P communication in a wireless communication network, the method comprising:

transmitting, by a first P2P device, a probe request frame including a message requesting a user identification information;

receiving, by the first P2P device, a probe response frame including user identification information which further includes a payload of an image;

storing the image and displaying, by the first P2P device, a contact point information including the image associated with the user identification information based on a stored image header information; and establishing, by the first P2P device, a connection with a second P2P device having transmitted the probe response frame including the user identification information when the displayed contact point information is selected.

13. An apparatus for discovering a peer to peer (P2P) device capable of performing P2P communication in a wireless communication network, comprising:

a Wi-Fi module for performing a function of an access point or a state in the P2P communication and for detecting a probe request frame from another P2P device; and a controller for in response to detecting the probe request frame, selecting an image to be transmitted from stored images;

detecting whether a size of the selected image exceeds a preset first threshold; and transmitting by the Wi-fi module a probe response frame including user identification information further including the selected image to the another P2P device when a message requesting the user identification information is included in the detected probe request frame, and when the size of the selected image is less than or equal to the preset first threshold.

14. The apparatus of claim 13, wherein when the Wi-Fi module receives the probe response frame including the image, the controller restores the image based on a stored image header information and controls a display unit to display the restored image.

15. The apparatus of claim 13, wherein the controller controls the Wi-Fi module to transmit the probe request frame including the message requesting the user identification information when a request of P2P connection is detected while the P2P device is displaying a phone book.

16. The apparatus of claim 14, wherein the controller changes a format of the selected image when the size of the selected image exceeds the preset first threshold, and controls the Wi-Fi module to transmit the image whose format is changed when the size of the image whose format is changed is less than or equal to a preset second threshold.

17. The apparatus of claim 16, wherein the controller shapes the selected image or the image whose format is changed based on a stored image header information when the size of the image whose format is changed exceeds the preset second threshold, and controls the Wi-Fi module to transmit a payload except for a header from the shaped image.

18. The apparatus of claim 17, wherein the image header information includes at least one of format information, image size information, and image palette information.

19. The apparatus of claim 13, wherein the controller shapes the selected image based on stored image header information, and controls the Wi-Fi module to transmit a payload except for a header from the shaped image.

* * * * *

UNITED STATES PATENT AND TRADEMARK OFFICE
CERTIFICATE OF CORRECTION

PATENT NO.       : 9,055,391 B2
APPLICATION NO.  : 13/767334
DATED            : June 9, 2015
INVENTOR(S)      : Changsoon Kim et al.

Page 1 of 1

It is certified that error appears in the above-identified patent and that said Letters Patent is hereby corrected as shown below:

In the Claims,

Column 16, Claim 16, Line 29 should read as follows:
--...claim 13, wherein the...--

Signed and Sealed this
Twenty-ninth Day of September, 2015

Michelle K. Lee
*Director of the United States Patent and Trademark Office*